Dec. 11, 1928.  1,694,907
J. W. ANDERSON
INDICATING MEANS
Filed March 28, 1927  3 Sheets-Sheet 1
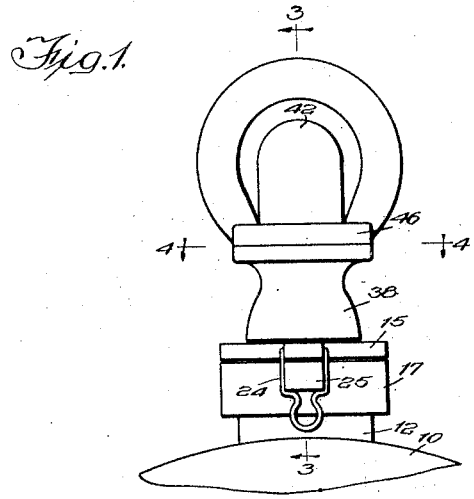
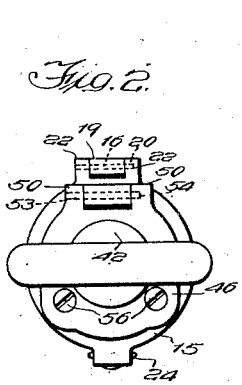
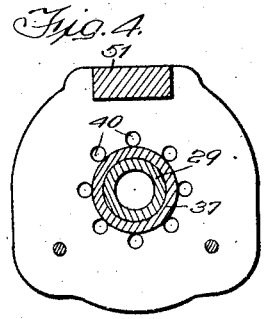
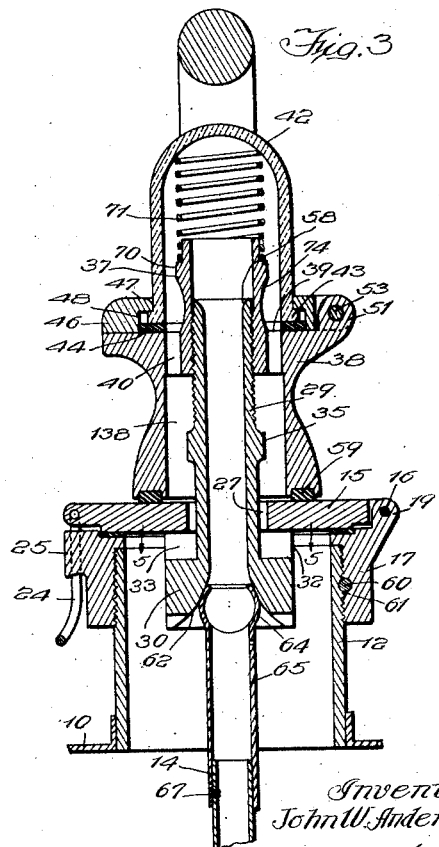
Inventor:
John W. Anderson Dec. 11, 1928.  1,694,907
J. W. ANDERSON
INDICATING MEANS
Filed March 28, 1927   3 Sheets-Sheet 2
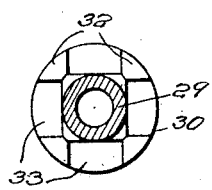
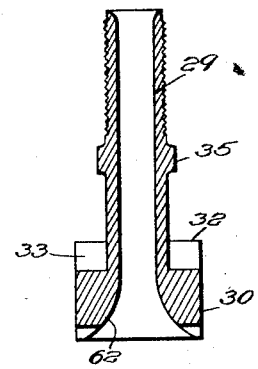
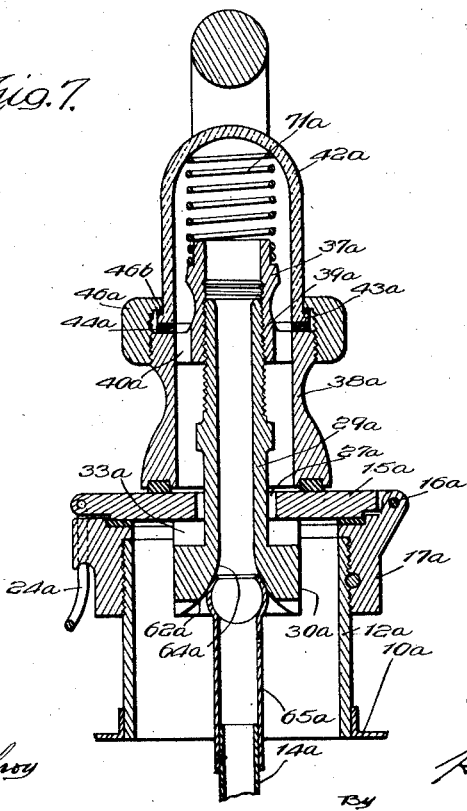

Dec. 11, 1928.  1,694,907
J. W. ANDERSON
INDICATING MEANS
Filed March 28, 1927   3 Sheets-Sheet 3
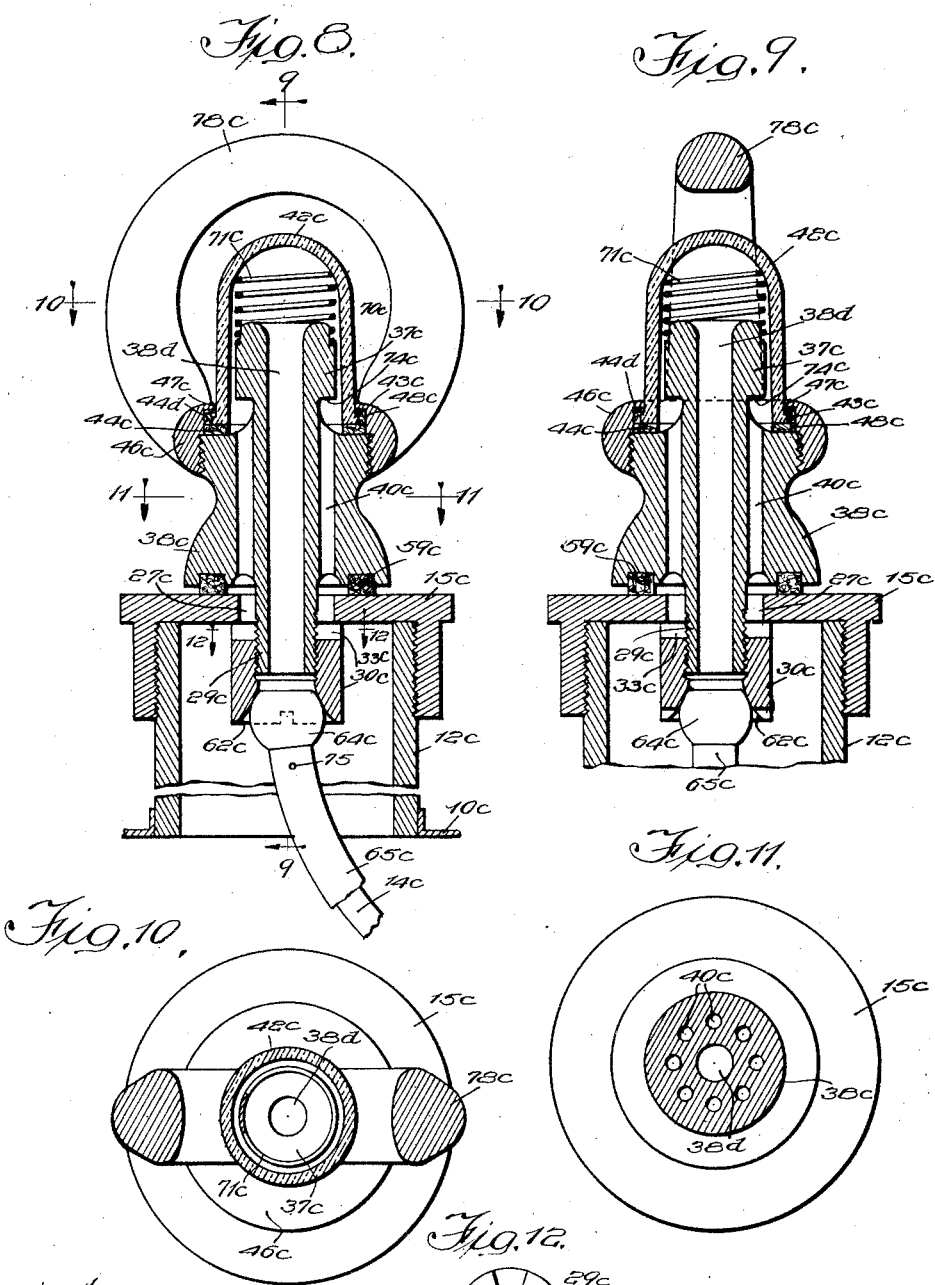

Patented Dec. 11, 1928.

1,694,907

UNITED STATES PATENT OFFICE.

JOHN W. ANDERSON, OF GARY, INDIANA.

INDICATING MEANS.

Application filed March 28, 1927. Serial No. 178,993.

My invention relates broadly to indicating devices and particularly to indicating devices of the type shown and described in my copending application, Serial No. 111,345, filed May 24, 1926.

Apparatus embodying my invention is particularly adapted to be used in connection with the cooling systems of the internal combustion engines associated with automobiles, or the like, the apparatus being adapted to warn the operator in advance of imminent wastage of cooling liquid because of overheating and of wastage of the cooling liquid when such wastage is in progress.

A particular object of the present invention is to provide a device of the kind described which will function efficiently, is neat and compact and may be easily and quickly mounted upon radiators which are now in existence as well as upon radiators which are manufactured specifically for this purpose.

Another particular object of the invention is to provide improved means for preventing the glass tubes or domes from cracking when they are suddenly subjected to hot or cold liquids or fluids.

Another particular object of the invention is to provide a device of the kind described which may be locked effectively to the filling tube of an automobile radiator to prevent unauthorized removal thereof.

Still another particular object of the invention is to provide devices of the kind described which can be manufactured economically in commercial quantities.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevation of a device embodying the invention, the device being shown in connection with an automobile radiator;

Fig. 2 is a plan view of the improved device shown in Fig. 1;

Fig. 3 is a section taken on line 3—3 of Fig. 1;

Fig. 4 is a section taken on line 4—4 of Fig. 1;

Fig. 5 is a section taken on line 5—5 of Fig. 3;

Fig. 6 is a longitudinal section taken through one of the parts constituting the improved device shown in Fig. 1;

Fig. 7 is a vertical section taken through a device embodying another form of the invention;

Fig. 8 is a vertical section taken through a device embodying still another form of the invention;

Fig. 9 is a section taken on line 9—9 of Fig. 8;

Fig. 10 is a section taken on line 10—10 of Fig. 8;

Fig. 11 is a section taken on line 11—11 of Fig. 8; and

Fig. 12 is a section taken on line 12—12 of Fig. 8.

Referring for the present to Figs. 1 to 6 inclusive, I have shown a device embodying a preferred form of the invention, the device being shown mounted upon the filling tube 12 of a radiator 10 which is of the type commonly employed in automobiles, or the like. Only a fragmentary portion of the radiator is shown as the invention does not relate to the construction thereof. However, it will be noted that the radiator is provided with the usual overflow tube 14 which has its upper end centrally disposed in the filling tube 12, the lower end of the tube 14 preferably communicating with the atmosphere. The upper end of the filling tube 12 is normally closed by a cap 15, which in this instance, is pivoted by a pin 16 to a collar 17, the collar 17 being screw-threaded upon the filling tube 12. In the preferred embodiment of the invention, the pin 16 passes through a lug 19 formed upon the collar 17 and has one end seated in a recess 20 formed in one of a pair of lugs 22 which are preferably formed integral with the cap 15. This construction prevents unauthorized persons from quickly removing the pin 16 from the collar 17 and, therefore, prevents unauthorized removal of the cap together with the apparatus carried thereby. A bail 24 pivoted to the cap 15 may be employed to lock the cap 15 in its closed position, the bail being adapted to cooperate with a lug 25 secured to the collar 17. The cap 15 may be of any suitable construction and, in this instance, it may be assumed to represent any of the similarly pivotally mounted radiator caps now in existence as the apparatus carried by the cap 15 may be mounted upon substantially any cap through which a suitable aperture may be drilled.

Formed in the cap 15 is an aperture 27 which is preferably concentrically disposed with respect to the overflow tube 14 and accommodates a tube 29 which, at its lower end, is provided with a head 30. The head 30 is preferably provided with lugs 32 which are engageable with the under surface of the cap 15 and are adapted to form passages or notches 33 through which fluid may pass from the filling tube 12 out through the aperture 27. It will be noted that that portion of the tube 29 which projects through the aperture 27 is of less diameter than the aperture 27. Intermediate its ends, the tube 29 is preferably provided with an enlarged portion 35. The purpose of this construction will presently appear.

The upper end of the tube 29 is preferably screw-threaded into a tubular member or extension 37 which is preferably formed integral with a larger tubular member 38, an inwardly projecting flange 39 being formed upon the tubular member 38 to connect the tubular member 37 thereto. The construction is such that the tubular member 38 together with its extension 37 may be referred to as a tubular member. The tubular member 38 cooperates with the tube 29 to form an annular passage 138 which communicates with the interior of the radiator through the aperture 27 and passages 33. Formed in the flange 39 are apertures or ports 40 through which fluid may pass from the annular passage 138 into a dome or hollow member 42 preferably formed of glass or other transparent material. An outwardly extending annular flange 43 formed upon the lower end of the hollow member 42 preferably rests upon a rubber gasket 44, or the equivalent, supported by the tubular member 38, the flange 39 being held in engagement with the gasket 44 by a collar 46 having a central aperture 47 through which the dome or hollow member 42 projects. As best shown in Fig. 3, the aperture 47 is enlarged at its lower end as indicated at 48 to accommodate the flange 43. Preferably formed integral with the collar 46 are lugs 50 which are positioned one on each side of a lug 51 preferably formed integral with the tubular member 38, a pin 53 being provided for pivoting the lugs 50 to the lug 51. As indicated in dotted lines in Fig. 2, one end of the pin 53 projects into a recess 54 provided in one of the lugs 50, the construction being such that unauthorized removal of the pin 53 is prevented. Screws 56 or the equivalent, are preferably provided for rigidly securing the collar 46 to the tubular member 38 so that the collar can not be accidentally displaced. However it is readily understood that if the glass member 42 is to be replaced or if it is to be cleaned, the screws 56 may be withdrawn and the collar 46 may be angularly displaced into a position wherein it will permit the glass member 42 to be removed from the device.

The upper end of the tube 29 is preferably screw-threaded into the tubular member 37, the tube 29 being adapted to project beyond the screw-threads in the tubular member 37 so that the upper edge of the tube may be deformed to lock the tubular member 37 to the tube. Thus, it will be noted that the upper end of the passage through the tube 29 is flared outwardly as at 58 so that a relatively thin end is provided upon the tube. Obviously, any suitable tool may be introduced into the upper end of the tube to expand it so that the tube can not be readily removed from the tubular member 37. As best shown in Fig. 6, the screw-threads provided upon the tube 29 terminate a short distance from the upper end thereof to permit this deformation of the upper end of the tube. Obviously the tube 29 then locks the tubular member 38 to the cap 15 and prevents unauthorized removal of the improved device from the cap. If desired, a gasket 59 may be positioned between the tubular member 38 and the cap 15.

In the preferred embodiment of the invention, the collar 17 is preferably rigidly secured to the filling tube 12 by a pin 60, or the equivalent, driven into a bore 61 which extends into both the collar and the filling tube 12. The bore 61 is preferably closed at one end so that a punch, or the like, can not be used to drive the pin out of the bore.

The lower end of the passage extending through the tube 29 is also tapered as indicated at 62, the tapered surface 62 being formed in the head 30 and being engageable by a ball-shaped end 64 formed upon the upper end of a tube 65 which preferably telescopes upon the upper end of the over-flow tube 14. In practice, the tube 65 is preferably rigidly secured to the upper end of the over-flow tube 14 by punching a projection 67 into the tube 65, which projection 67 projects into a depression simultaneously formed in the wall of the over-flow tube 14. The ball-shaped end 64 of the tube 65 cooperates with the flared portion 62 to form a ball and socket joint between the tube 65 and the tube 29, the construction being such that when the cap 15 is moved into its closed position, the flared portion 62 guides the ball-shaped portion 64 into its correct position with respect to the passage extending through the tube 29.

As best shown in Fig. 3, the upper end of the tubular member 37 is formed to provide a shoulder 70 between which and the upper end of the glass member 42 a compression spring 71 is positioned, the tubular member 37 functioning to center the spring in the glass member. The spring 71 prevents the glass member 42 from cracking when it is suddenly subjected to hot or cold liquid. Thus, in some automobiles, the cooling systems are controlled by thermostatic devices which prevent circulation of the cooling liquid until the liquid in the water jackets of the engines has been heated to a predetermined temperature. Then, when the thermostatic devices permit the liquid to circulate, a quantity thereof is driven up into the glass members 42 and unless the glass members are protected in some manner they will crack. However, I find that if springs 71, or the equivalent, are provided, they will prevent such injury to the glass members.

It will be noted that the tubular member 37 is provided intermediate its ends with an annular groove 74 which tends to direct vapor against the interior surface of the glass member 42. In other words, when vapor is forced upward through the ports or apertures 40 it will be forced upon the inner surface of the glass member and form a ring of water thereon which is readily discernible by the driver of the automobile.

The enlarged portion 35 is preferably provided upon the tube 29 to insure that an aperture of suitable diameter will be formed in the radiator cap when the device is to be assembled with the cap. Thus, assuming that the improved device is to be mounted upon a cap now in existence, an opening corresponding to the aperture 27 must be formed in the cap and this aperture must be of sufficient diameter to allow liquid and fluid to pass therethrough when the device has been assembled with the cap. Obviously, the tube 29 can not be assembled with a cap if the aperture therethrough is of less diameter than the enlarged portion 35.

The operation of the above described device shown in Figs. 1 to 6, inclusive, is substantially as follows: Assuming that there is an adequate supply of cooling liquid in the cooling system of the automobile upon which the device is mounted and assuming that the automobile is in operation, it is obvious that no active indication of any kind will be given in the glass dome or member 42 when the temperature of the cooling fluid does not approach the boiling point. However, if for any reason, the temperature of the cooling fluid approaches the boiling point, this fact will be indicated in the glass member 42 by a solid column of water which will rise and fall because of the lack of balance between the pressure within the cooling system and the height of the column of water extending up into the glass member. If the condition which causes this rise in temperature of the cooling liquid is not corrected and the cooling liquid boils with sufficient violence to create a relatively high pressure within the cooling system, a steady flow of liquid through the glass dome will be observed, the liquid being discharged from the cooling system through the overflow tube 14. Briefly, the pressure created within the cooling system causes the liquid to pass up through notches or passages 33 and the aperture 27 into the tubular member 38 and thence through the aperture or ports 40 and the glass member 42 down through the tubular member 37 and the tube 29 into the tube 65 which discharges the liquid into the overflow tube 14. Now, if it is assumed that the cooling liquid continues to waste until there is an insufficient supply thereof in the cooling system, a mixture of vapor and liquid passes through the glass member 42 and wastes through the overflow tube 14, the vapor and liquid churning violently in such manner that it is readily observable. This latter signal continues until there is no liquid left in the radiator or until the cooling liquid ceases to boil.

The above described signals given in the glass member 42 indicate four different stages through which the cooling liquid passes when its temperature is raised from atmospheric temperature to a temperature which causes it to waste continually through the overflow tube 14. These stages are as follows:

The first stage: from atmospheric temperature to normal operating temperature. During this stage, no active signal is given in the glass member 42.

The second stage: from normal operating temperature to simmering temperature which precedes violent boiling. An unbroken column of liquid then rises and falls in the glass member 42.

The third stage: from simmering temperature creating comparatively slight pressure to violent boiling which causes a wastage of cooling liquid because of the relatively high pressure produced in the radiator. The glass member 42 then becomes completely filled with an unbroken column of liquid flowing therethrough and wasting through the overflow tube 14.

The fourth stage: from active boiling and wasting of a still adequate supply of cooling liquid to a comparatively superheated and wasting of a substantially overheated liquid. During this stage the water ring appears on the interior surface of the glass member 42 and warns the driver that the supply of cooling liquid must be replenished if the engine is to be protected against serious injury.

In Fig. 7, I have shown another form of the invention embodied in a device which resembles the device shown in Figs. 1 to 6, inclusive. Thus, I have shown a collar 17$^a$ which is screw-threaded upon a filling tube 12$^a$ forming part of a radiator 10$^a$, the radiator 10$^a$ being of the type commonly employed in automobiles or the like. Pivoted by a pin 16ª to the collar 17ª is a cap 15ª which is substantially identical with the aforementioned cap 15 and may be locked by a bail 24ª against angular displacement around the pin 16ª. A tube 29ª is provided with a head 30ª and is screw-threaded into a tubular member 37ª which is preferably formed integral with a tubular member 38ª, the tubular members 37ª and 38ª being substantially identical with the aforementioned tubular members 37 and 38. However, in this instance, the screw-threads provided in the tubular member 37ª extend above the upper end of the tube 29ª and the screw-threads of the tube 29ª extend to the upper end thereof, the upper end of the tube 29ª being expanded to cause the screw-threads of the tube to frictionally engage the screw-threads of the tubular member 37ª with sufficient force to prevent unauthorized removal of the tubular member 37ª and the tubular member 38ª formed integral therewith. The tubular member 37ª is joined to the tubular member 38ª by a flange 39ª provided with bores or apertures 40ª and the tube 29ª projects through an aperture 27ª formed in the cap 15ª, the diameter of the aperture 27ª being of such size that vapor and liquid may pass from the filling tube 12ª up through notches or passages 33ª provided in the head 30ª and thence through the aperture 27ª into the tubular member 38ª. This vapor then passes from the tubular member 38ª up through the bores or apertures 40ª into a dome or hollow member 42ª which is substantially identical in construction to the aforementioned glass member 42. The glass member 42ª is preferably provided with a flange 43ª which is secured to the tubular member 38ª by a collar 46ª screw-threaded upon the tubular member 38ª. If desired, a gasket 46ᵇ may be inserted between the collar 46ª and the flange 43ª and a gasket 44ª may be inserted between the flange 43ª and the upper end of the tubular member 38ª. The lower end of the passage extending through the tube 29ª preferably terminates in an outwardly flaring surface 62ª which is engageable by a ball-shaped end 64ª formed upon one end of a tube 65ª, the tube 65ª being adapted to telescope upon the upper end of an overflow tube 14ª provided in the radiator 10ª. In practice, the tube 65ª is preferably secured to the overflow tube 14ª in substantially the same manner as the aforementioned tube 65 is secured to the overflow tube 14. A spring 71ª engages the glass member 42ª and has substantially the same functions as the aforementioned glass 71.

The operation of the apparatus illustrated in Fig. 7 is substantially identical to the operation of the apparatus shown in Figs. 1 to 6, inclusive.

Referring now to Figs. 8 to 12, inclusive, wherein I have shown still another form of the invention embodied in a device adapted to be used in connection with the cooling system of an internal combustion engine, the reference character 10ᶜ designates an automobile radiator provided with a filling tube 12ᶜ which is normally closed by a cap 15ᶜ, the cap 15ᶜ being shown screw-threaded upon the filling tube 12ᶜ. Formed in the cap 15ᶜ is a central aperture 27ᶜ. A tubular extension 29ᶜ formed upon a member 38ᶜ projects downward through the aperture 27ᶜ and has a nut 30ᶜ screw-threaded thereon. The nut 30ᶜ is provided with a plurality of notches 33ᶜ which permit liquid and vapor to flow from the filling tube 12ᶜ up through the aperture 27ᶜ and thence through passages 40ᶜ provided in the member 38ᶜ. At its upper end the member 38ᶜ is provided with a central extension 37ᶜ which corresponds to the aforementioned tubular member 37. A central passage 38ᵈ extends through the member 38ᶜ and the extensions 29ᶜ and 37ᶜ provided thereon. A nut 30ᶜ cooperates with the extension 29ᶜ to secure the member 38ᶜ to the cap 15ᶜ, a gasket 59ᶜ being preferably provided between the member 38ᶜ and the cap. The extension 37ᶜ projects up into a dome or hollow member 42ᶜ which is substantially identical in construction to the aforementioned glass member 42 and is provided with an outwardly extending flange 43ᶜ which extends into an enlarged portion 48ᶜ of an aperture 47ᶜ provided in a collar 46ᶜ, the collar 46ᶜ being screw-threaded upon the member 38ᶜ. Interposed between the flange 43ᶜ and the collar 46ᶜ is a gasket 44ᵈ and interposed between the flange 43ᶜ and the member 38ᶜ is a gasket 44ᶜ. It will be noted that the extension 37ᶜ is undercut to provide an annular shoulder 74ᶜ. Obviously, when vapor passes upward in the passages 40ᶜ it strikes the annular shoulder 74ᶜ and deflects against the inner surface of the glass member 42ᶜ so that it may condense thereon and give a visible signal.

The passage through the nut 30ᶜ is provided with an outwardly flaring surface 62ᶜ which corresponds to the aforementioned flaring surface 62 and is engageable by a ball-shaped end 64ᶜ provided upon a tube 65ᶜ which is adapted to telescope upon an overflow tube 14ᶜ provided in the radiator 10ᶜ. The tube 65ᶜ is preferably secured to the overflow tube 14ᶜ in substantially the same manner as the aforementioned tube 65 is secured to the overflow tube 14. It is readily understood that if the cap 15ᶜ is removed from the filling tube 12ᶜ and then replaced thereon, the flaring surface 62ᶜ will guide the ball-shaped end 64ᶜ into its proper position with respect to the passage 38ᵈ provided in the member 38ᶜ. To prevent a siphoning action from being set up, I preferably provide an aperture or vent 75 in the tube 65ᶜ.

Interposed between the upper end of the glass member 42ᶜ and an annular shoulder 70ᶜ provided upon the extension 37ᶜ is a compression spring 71ᶜ which has substantially the same function as the aforementioned spring 71. An arcuate member 78ᶜ is preferably formed integral with the collar 46ᶜ and is adapted to protect the glass member 42ᶜ.

The operation of the device illustrated in Figs. 8 to 12, inclusive, is substantially identical with the operation of the device shown in Figs. 1 to 6, inclusive.

Having thus described my invention, it is obvious that various immaterial modifications may be made in the same without departing from the spirit of my invention; hence I do not wish to be understood as limiting myself to the exact form, construction, arrangement and combination of parts here-in shown and described, or uses mentioned.

What I claim as new and desire to secure by Letters Patent is:

1. An indicating device of the kind described adapted to be mounted upon the closure member for the filling opening of an automobile radiator provided with an over-flow pipe, said indicating device comprising a tube arranged to project through an aperture in said closure member, a tubular member having a tubular extension engageable with the upper end of said tube, a transparent hollow member communicating with the interior of said radiator through said tubular member and said aperture, said hollow member communicating with said tube through said tubular extension, and a second tube whereby the first tube communicates with said over-flow pipe.

2. An indicating device of the kind described adapted to be mounted upon the closure member for the filling opening of an automobile radiator provided with an over-flow pipe, said indicating device comprising a tube arranged to project through an aperture in said closure member, a tubular member having a tubular extension engageable with the upper end of said tube, a transparent hollow member communicating with the interior of said radiator through said tubular member and said aperture, said hollow member communicating with said tube through said tubular extension, and a second tube whereby the first tube communicates with said over-flow pipe, said second tube being provided with a ball-shaped end engageable with the first tube to insure proper alignment of said tubes when they engage each other.

3. An indicating device of the kind described adapted to be mounted upon the closure member for the filling opening of an automobile radiator provided with an over-flow pipe, said indicating device comprising a tube arranged to project through an aperture in said closure member, means provided upon the tube for engaging the inner surface of the closure member, said means being formed with passages whereby fluid may flow from the interior of said radiator up through said aperture along the outer surface of said tube, a tubular member engageable with said tube and adapted to cooperate with said means to clamp the indicating device to said closure member, a substantially transparent hollow member mounted upon said tubular member and communicating therethrough and through said passages with the interior of the radiator, and a second tube whereby said first tube communicates directly with said over-flow pipe, said hollow member communicating with said over-flow pipe through said first and second tubes.

4. An indicating device of the kind described adapted to be mounted upon the closure member for the filling opening of an automobile radiator provided with an over-flow pipe, said indicating device comprising a tube arranged to project through an aperture in said closure member, means provided upon the tube for engaging the inner surface of the closure member, said means being formed with passages whereby fluid may flow from the interior of said radiator up through said aperture along the outer surface of said tube, a tubular member engageable with said tube and adapted to cooperate with said means to clamp the indicating device to said closure member, a substantially transparent hollow member mounted upon said tubular member and communicating therewith and through said passages with the interior of the radiator, a second tube whereby said first tube communicates directly with said over-flow pipe, said hollow member communicating with said over-flow pipe through said first and second tubes, and said second tube being provided with a ball-shaped end engageable with the first tube to insure proper alignment of said tubes when they engage each other.

5. An indicating device of the kind described adapted to be mounted upon the closure member for the filling opening of an automobile radiator provided with an over-flow pipe, said indicating device comprising a tube arranged to project through an aperture in said closure member, a tubular member having a tubular extension engageable with the upper end of said tube, a transparent hollow member communicating with the interior of said radiator through said tubular member and said aperture, means adjacent to said extension functioning as a baffle member to retard the flow of fluid from the radiator into said hollow member, said hollow member communicating with said tube through said tubular extension, and a second tube whereby the first tube communicates with said over-flow pipe.

6. An indicating device of the kind described adapted to be mounted on the closure member for the filling opening of an automobile radiator having an over-flow pipe, said indicating device comprising a tube arranged to project through an aperture in said closure member, a second tube connecting the first tube to the over-flow pipe, a tubular member disposed concentrically with the first tube and having an internal diameter larger than the external diameter of the first tube to form an annular passage around the first tube, a second tubular member carried by the first tubular member at the upper end thereof and adapted to cooperate with the first tube to form an extension thereof, and a glass dome communicating with said annular passage and also with the passage in said first tube through said second tubular member.

7. An indicating device of the kind described adapted to be mounted on the closure member for the filling opening of an automobile radiator having an over-flow pipe, said indicating device comprising a tube arranged to project through an aperture in said closure member, a second tube connecting the first tube to the over-flow pipe, a tubular member disposed concentrically with the first tube and having an internal diameter larger than the external diameter of the first tube to form an annular passage around the first tube, a second tubular member carried by the first tubular member at the upper end thereof and adapted to cooperate with the first tube to form an extension thereof, a glass dome communicating with said annular passage and with the passage in said first tube and said second tubular member, and apertured means extending between the first and second tubular members for retarding the flow of fluid through said annular passage.

8. An indicating device of the kind described adapted to be mounted upon an apertured closure member for the filling opening of an automobile radiator provided with an over-flow pipe therein, said indicating device comprising a tube arranged to project through said closure member, a tubular member disposed around said tube to form an annular passage communicating with the interior of the radiator through the apertured closure member, a transparent hollow member mounted upon said tubular member and communicating with said annular passage, said hollow member also communicating with said tube, and a second tube whereby the first-mentioned tube communicates with said over-flow pipe.

9. An indicating device of the kind described adapted to be mounted upon an apertured closure member for the filling opening of an automobile radiator provided with an over-flow pipe therein, said indicating device comprising a tube arranged to project through said closure member, a tubular member disposed around said tube to form an annular passage communicating with the interior of said radiator through said closure member, means at one end of said annular passage for retarding the flow of fluid therethrough, a substantially transparent hollow member mounted upon said tubular member and communicating with said annular passage, said hollow member also communicating with said tube, and a second tube whereby the first-mentioned tube communicates with said over-flow pipe.

10. An indicating device of the kind described adapted to be mounted upon an apertured closure member for the filling opening of an automobile radiator provided with an over-flow pipe therein, said indicating device comprising a tube projecting through said closure member, a second tube whereby the first-mentioned tube communicates with said over-flow pipe, a tubular member disposed around said first-mentioned tube to provide an annular passage communicating with the interior of said radiator through said closure member, a substantially transparent hollow member mounted upon the upper end of said tubular member and communicating with said annular passage, and an apertured collar pivoted to said tubular member for securing said hollow member thereto, said hollow member also communicating with said first-mentioned tube.

11. In combination with an automobile radiator having an over-flow pipe and provided with a filling opening, a pivoted closure member for said filling opening, said closure member being provided with an aperture therethrough, a tube projecting through said aperture, a second tube whereby said first-mentioned tube communicates with said over-flow pipe, said first-mentioned tube being detachably engageable with said second tube, a tubular member disposed around said first-mentioned tube to provide an annular passage communicating with the interior of said radiator through said aperture, and a substantially transparent hollow member detachably secured to said tubular member, said hollow member being arranged to communicate with said annular passage and with said first-mentioned tube.

12. An indicating device of the kind described adapted to be mounted upon an apertured closure member for the filling opening of an automobile radiator provided with an over-flow pipe therein, said indicating device comprising a tube arranged to project through said closure member and provided with means engageable with the inner side of said closure member, said tube being adapted to be connected to said over-flow pipe, a tubular member disposed around said tube to provide an annular passage communicating with the interior of said radiator through said closure member, a portion of said tube being expanded to rigidly secure it to said tubular member, and said tubular member being arranged to cooperate with said means to secure said device to said closure member and a substantially transparent hollow member mounted upon said tubular member, said hollow member being arranged to communicate with said annular passage and with said tube.

13. In an indicating device of the class described, a hollow glass member through which fluid may flow, and resilient metallic means arranged in said hollow member to prevent cracking thereof when said hollow member is subjected to fluid of a temperature which differs from the temperature thereof.

14. A device of the kind described adapted to be mounted upon the closure member for the filling opening of an automobile radiator provided with an overflow pipe, said indicating device comprising a tube which projects through an aperture in said closure member and is adapted to discharge into said overflow pipe, a tubular member having a tubular extension engageable with the upper end of said tube, a transparent hollow member communicating with said radiator through said tubular member and said aperture, and means adjacent to said extension functioning as a baffle member to retard the flow of fluid from the radiator into said hollow member, said hollow member communicating with said tube through said tubular extension.

15. A device of the kind described adapted to be mounted upon the closure member for the filling opening of an automobile radiator provided with an overflow pipe, said device comprising a tube arranged to project through an aperture in said closure member and provided with a head engageable with the inner surface of said closure member, said head being provided with a passage whereby fluid may flow from said radiator up through said aperture in said closure member, said tube being adapted to discharge into said overflow pipe, a tubular member disposed above said closure member and engageable with said tube to secure said device to said closure member, said tubular member being of a larger diameter than said tube to provide an annular passage around said tube through which fluid may flow from said aperture, and a hollow transparent member carried by said tubular member and arranged to communicate with said annular passage and said tube.

16. An indicating device of the kind described, adapted to be mounted upon the closure member of the filling opening of an automobile radiator, said indicating device comprising a glass member, means for mounting said glass member upon the closure member, means for permitting cooling fluid from the radiator to come into contact with said glass member, and metallic means carried by said last named means and engaging a portion of said glass member to prevent cracking thereof when it is subjected to fluid differing in temperature from that of the glass.

17. In combination with a radiator having a filling opening and an overflow pipe, a hollow glass member arranged above said filling opening and forming a passage whereby fluid may flow from said radiator to said overflow pipe, tubular means constituting a prolongation of said overflow pipe and extending into said hollow member, and metallic means supported by said tubular means and contacting with said hollow member to prevent cracking thereof when the latter is subjected to a fluid of a temperature different from that of said hollow member.

18. An indicating device of the kind described, adapted to be mounted upon the closure member of a filling opening of an automobile radiator, said indicating device comprising a glass member, means for mounting said glass member upon the closure member, tubular means supported within said hollow member, and metallic means carried by said tubular means and engaging said glass member, said metallic means being adapted to prevent cracking of the glass member when it is subjected to fluid differing in temperature from that of the glass.

19. An indicating device of the kind described comprising an apertured closure member for the filling opening of an automobile radiator provided with an overflow pipe, a substantially transparent hollow member mounted above the closure member and adapted to receive vapor and liquid from said radiator through said aperture in said closure member, tubular means mounted upon said closure member and arranged to communicate with the interior of said hollow member, said tubular means being so constructed that vapor and liquid may pass through said aperture in said closure member up into said hollow member, and a tube adapted to be positioned upon said overflow pipe and arranged to form a ball and socket joint with said tubular means, said tube being adapted to discharge vapor and liquid from said hollow member into said overflow pipe.

20. An indicating device of the kind described comprising an apertured closure member for the filling opening of an automobile radiator provided with an overflow pipe, a substantially transparent hollow member mounted above the closure member and adapted to receive vapor and liquid from said radiator through said aperture in said closure member, tubular means mounted upon said closure member and arranged to communicate with the interior of said hollow member, said tubular means being so constructed that vapor and liquid may pass through said aperture in said closure member up into said hollow member, and means disposed at one end of the overflow pipe for forming a ball and socket joint with said tubular means, said tubular means being adapted to discharge vapor and liquid from said hollow member into said overflow pipe through said ball and socket joint.

21. The combination with an indicating device comprising an apertured closure member for the filling opening of an automobile radiator provided with an overflow pipe, a substantially transparent hollow member mounted above the closure member and adapted to receive liquid and vapor from said radiator through said aperture in said closure member, and tubular means communicating with the interior of said hollow member and adapted to discharge vapor and liquid from said hollow member, of means arranged at one end of said overflow pipe for forming a ball and socket joint with said tubular means, said overflow pipe communicating with said hollow member through said ball and socket joint and said tubular means.

In testimony whereof, I have hereunto signed my name.

JOHN W. ANDERSON.